Figure 1:
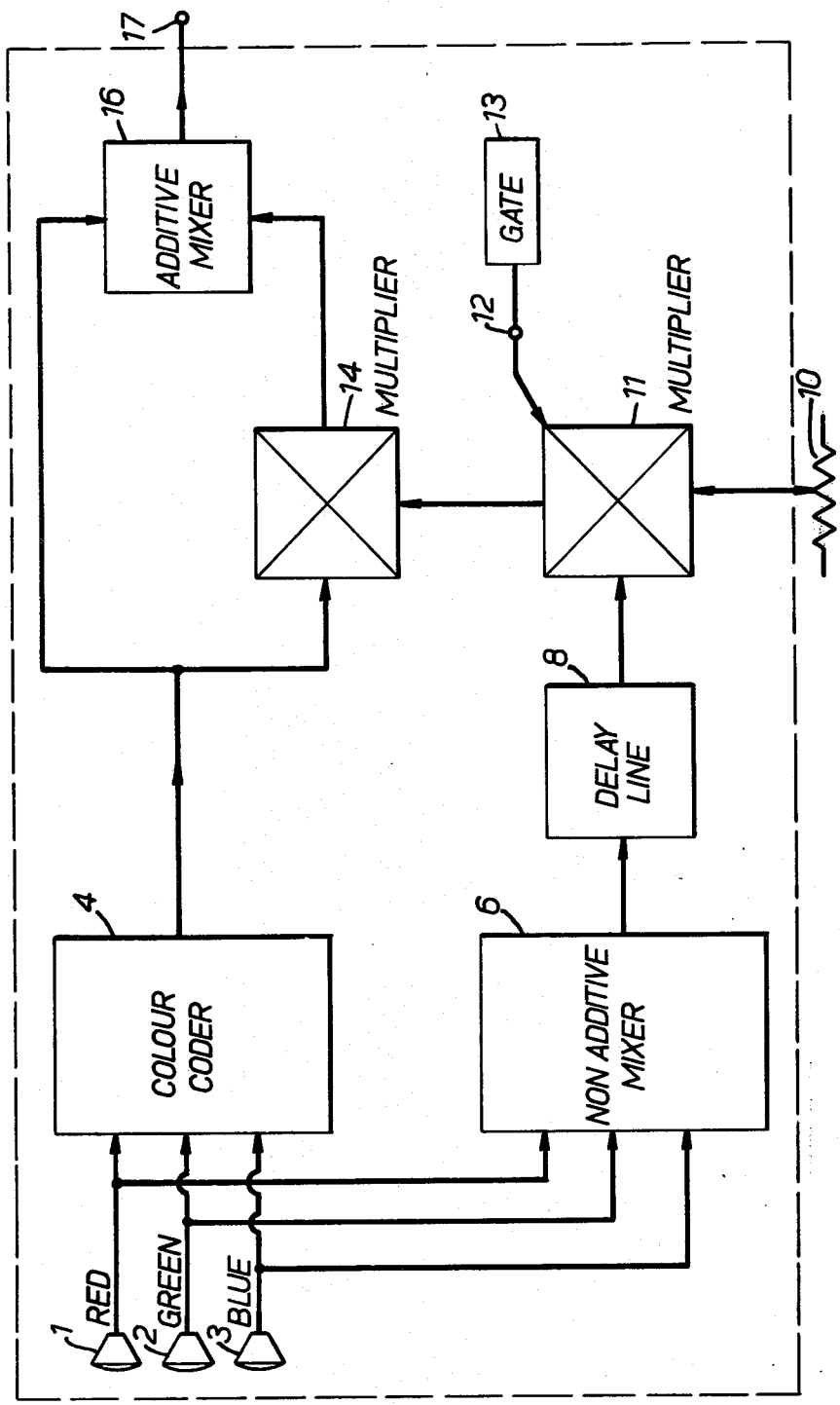

United States Patent [19]

Fenton

[11] 4,152,720
[45] May 1, 1979

[54] CONTRAST CORRECTION ARRANGEMENTS

[75] Inventor: Roger W. Fenton, Chelmsford, England

[73] Assignee: The Marconi Company Limited, Chelmsford, England

[21] Appl. No.: 822,666

[22] Filed: Aug. 8, 1977

[30] Foreign Application Priority Data

Sep. 16, 1976 [GB] United Kingdom ............... 38498/76

[51] Int. Cl.² ............................................ H04N 9/535
[52] U.S. Cl. ..................... 358/27; 358/21 R
[58] Field of Search ............... 358/21, 34, 168, 169, 358/171, 27

[56] References Cited

U.S. PATENT DOCUMENTS

| 3,128,334 | 4/1964 | Heuer | 358/34 |
|---|---|---|---|
| 3,544,709 | 12/1970 | Eckenbrecht | 358/21 X |
| 3,597,540 | 8/1971 | MacIntyre, Jr. | 358/168 |
| 3,637,921 | 1/1972 | Abel | 358/34 |
| 3,684,825 | 8/1972 | Dischert et al. | 358/27 |

Primary Examiner—John C. Martin
Assistant Examiner—Aristotelis M. Psitos
Attorney, Agent, or Firm—Diller, Ramik & Wight

[57] ABSTRACT

A contrast correction arrangement for a color television system detects the signal representative of the greatest brightness in a viewed scene, and multiplies the difference between the detected signal and a predetermined peak amplitude thereof by a control signal to produce a further signal which is variable in both sign and magnitude in dependence upon the departure of the detected signal from peak amplitude. A further multiplier multiplies the further signal with a normally provided composite color coded signal thereby to produce a video correction signal of sign varying in dependence upon the sign of the said further signal which is, in turn, mixed with the composite color coded signal to produce a resultant video signal of compressed, normal or expanded contrast range.

7 Claims, 6 Drawing Figures

CONTRAST CORRECTION ARRANGEMENTS

This invention relates to a contrast correction arrangement for use in a colour television system.

It is known that in a colour television system only a limited range of contrast can be reproduced due to limitations at both the imaging and display ends of the system which cause a reduction in the displayed contrast range to the order of 60:1. Such a reduction of contrast range is most noticeable with a natural, outdoor scene where, in good light conditions, the range of contrast may be several hundred to one. Conversely, at the other extreme, scenes televised in misty conditions may exhibit very limited contrast ranges, being in fact less than those capable of being reproduced by the television system.

Present day practice is to expose the television system with reference to the highlights of the scene so that the highlight brightness of the displayed image is held reasonably constant. Thus, scenes of large contrast range tend to be reproduced with a lack of information in the darker parts of the picture and scenes of low contrast range tend to appear "washed out" because the majority of the information is contained in the near whites. The contrast law of such known television systems is a nominally linear characteristic but it will be realised that if the characteristic could be adjusted then those parts of the viewed scene which are of most interest in forming the television image could be set to best utilise the fixed contrast range capability of the television system. In colour television generally the light from the televised scene is split into three primary colours, i.e. red, green and blue, which are separately imaged and gamma corrected in such a manner that the light in/-light out characteristic of each separate primary channel from imaging to display device is linear. It is well known that to maintain proper colorimentry any given ratio of input quantities of the red, green and blue signals should be reproduced in identical output ratios. Thus, it will be appreciated that any modification of the contrast law of the television system must be applied in such a way that the ratios between the primary signals are properly preserved. The present invention seeks to provide a contrast correction arrangement in which the foregoing criteria are observed.

According to this invention a contrast correction arrangement for use in a colour television system includes a plurality of camera tubes each for producing electrical signals corresponding to a different primary colour in a scene viewed by the tubes, a colour coder for producing from said plurality of camera tubes a composite colour coded signal in accordance with a predetermined broadcasting standard (e.g. PAL), means for producing a signal representative of the greatest brightness in the viewed scene, a multiplier for multiplying the difference between the signal representative of the greatest brightness and a first predetermined peak amplitude thereof by a control signal such that a further signal is produced which is variable in both sign and magnitude in dependence upon the departure of said signal representative of the greatest brightness from peak amplitude, a further multiplier for multiplying said further signal with the difference between said composite colour coded signal and a second predetermined amplitude so as to produce a video correction signal of sign varying in dependence upon the sign of said further signal, and a mixer for adding the video correction signal to the composite colour coded signal thereby to produce at the mixer output a video signal of compressed, normal or expanded contrast range.

Preferably, gate means connected to the normally provided line and field blanking circuits is arranged to switch off the first mentioned multiplier at times during the line and field blanking periods.

Conveniently, the means for producing a signal representative of the greatest brightness may be a non additive mixer known per se.

Advantageously, the mixer output is connected in a feedback loop with a restorer for determining the mean level of the mixer output signal above black level and a comparator for comparing the detector output with a D.C. reference signal whereby the resultant of said comparison is, in operation, applied as said control signal to said multiplier.

Figure 2A:
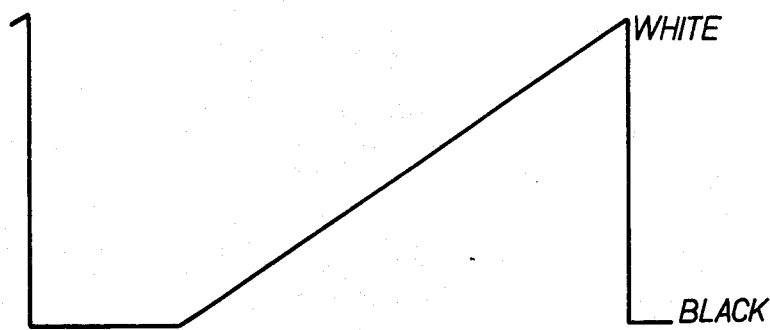
Figure 2B:
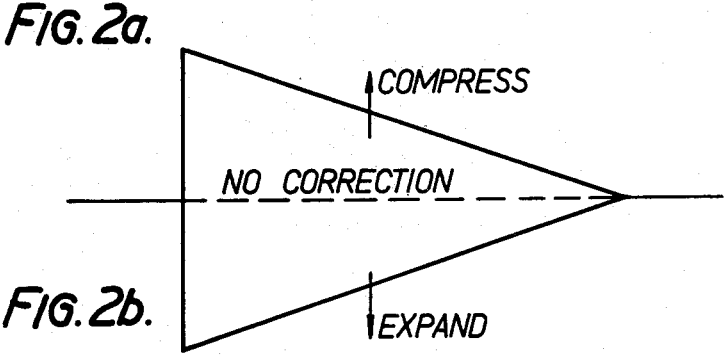
Figure 2C:
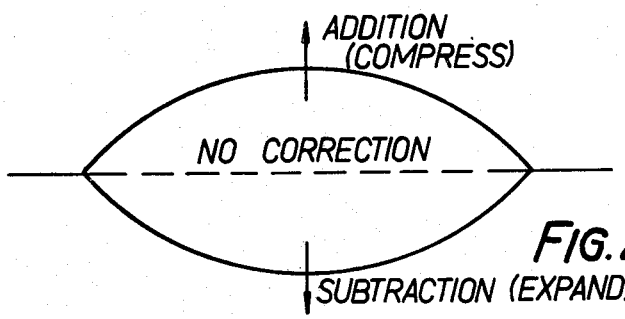
Figure 3:
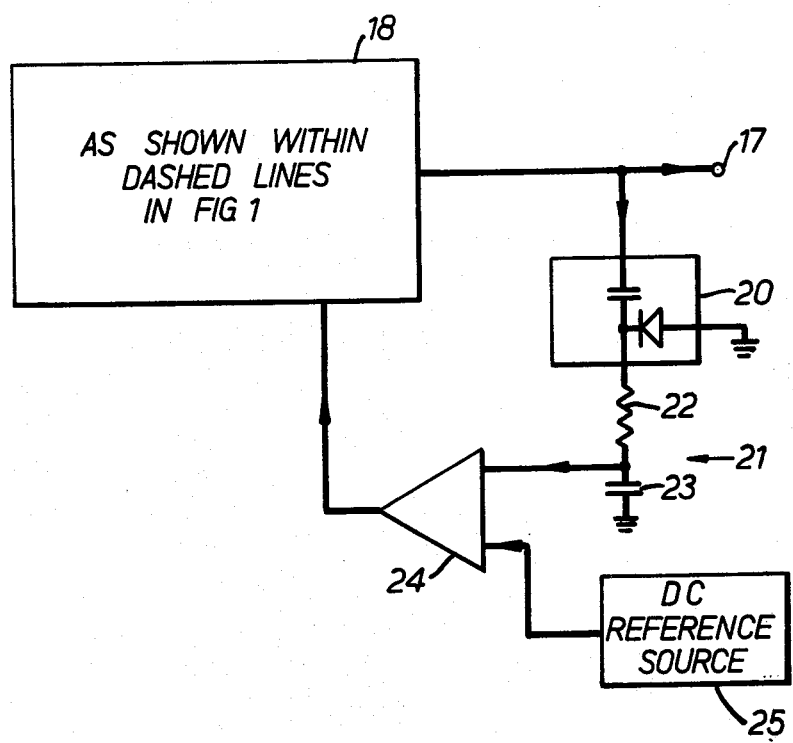

The invention will now be described, by way of example, with reference to the accompanying drawings in which, FIG. 1 is a block circuit diagram of an arrangement in accordance with this invention, FIGS. 2a, b, c and d are graphical test waveforms showing the signals at various parts of the circuit shown in FIG. 1, and FIG. 3 is a modification of the circuit of FIG. 1 in which the control signal for the arrangement is derived automatically.

Figure 2D:
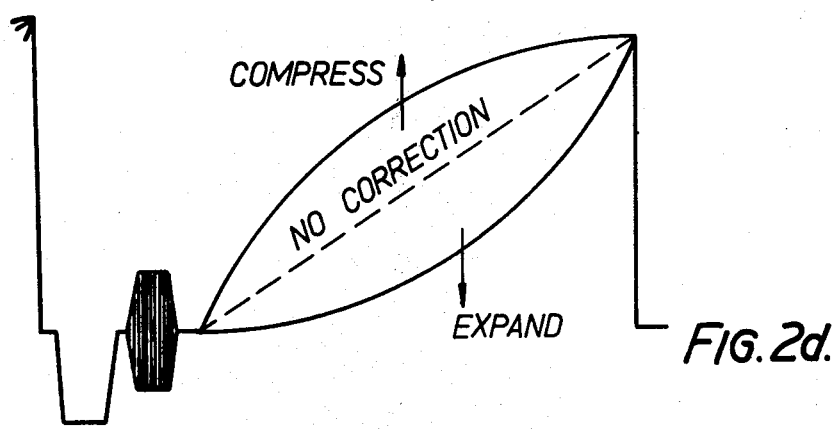

Referring to FIGS. 1 and 2a to 2d three camera tubes 1, 2, 3 each for producing an electrical signal corresponding to the primary colours red, green and blue respectively, the waveforms of which are shown in FIG. 2a, are connected to a colour coder 4 which generates a composite colour coded signal in accordance with a predetermined broadcasting standard, for example, PAL or NTSC, and to a known non-additive mixer 6. The mixer 6 produces at its output a signal representative of the greatest brightness in the viewed scene irrespective of whether the light originates from one or all the primary colour constituents of the scene. This signal is fed via a delay line 8 to produce a delayed signal which is in time synchronous with the output signal of the colour coder 4. The difference between the greatest brightness signal at the output of the delay line 8 and a predetermined peak amplitude, i.e. a datum level corresponding to white, is multiplied in a wide band multiplier 11 by a D.C. control signal which is derived from a potential applied across a potentiometer 10. Thus, the output of the multiplier 11, shown in FIG. 2b, varies in both sign and amplitude according to the product of the D.C. control signal and the value by which the signal representative of the greatest scene brightness departs from the predetermined peak amplitude. Thus, if the output of the mixer 6 is at peak amplitude, adjustment of the potentiometer 10 will produce no correction signal at the output of the multiplier 11, but for signals of less than peak amplitude the output of the multiplier will be a signal of sign and magnitude proportional to the D.C. control voltage established by the potentiometer 10. This D.C. control voltage is arranged to be adjustable about a condition representing a product in multiplier 11 of zero. To ensure that an output signal from the multiplier 11 is not produced in the television line and field blanking periods, which could cause a modification to the transmitted synchronising pulse, a composite line and field blanking signal is applied at a terminal 12 of the multiplier 11 from a gate means 13 connected to the normally provided line and field blanking circuits so as to turn off the multiplier 11 during these periods. The output of the multiplier 11 is connected to one input of a further multiplier 14, the other input of which is fed from the colour coder 4. The multiplier 14 multiplies the output of multiplier 11 with the difference between the signal from the colour coder 4 and a datum level corresponding to black. In this manner, during the picture period the input to the multiplier 14 from the multiplier 11 varies in sign and magnitude in dependence upon the product of scene brightness departure from peak amplitude and the D.C. control voltage to control the multiplier 14 such that by movement of the potentiometer 10 an operator can choose between zero, additive or subtractive correction signals shown by the waveform of FIG. 2c. The left-hand (black) and right-hand (white) ends of this waveform have zero values since for a white level signal from the mixer 6, the D.C. signal from the potentiometer 10 is multiplied by a zero multiplication factor at the multiplier 11, and for a black level signal from the mixer 6, the output of the multiplier 11 is multiplied by a zero multiplication factor at the multiplier 14. The correction signal from the multiplier 14 is applied as one input to an additive mixer 16, the other input of the mixer 16 being derived from the composite coded colour signal at the output of the colour coder 4 so that a video coded output signal is produced at an output terminal 17 of the mixer 16. Thus, the output signal at terminal 17 as shown by FIG. 2d represents a compressed, normal or expanded contrast range in dependence whether an operator moves the slider of the potentiometer 10 to produce an additive, zero or subtractive signal output of the multiplier 14. It will now be seen that the present invention varies the gain of each primary channel of the television system in unison as a function of scene brightness so that where it is noted, for example, that a dark area of a high contrast scene exists the gain of the three channels can be increased so that the reproduced image in this area is displayed at a greater brightness; that is the original scene contrast range is compressed. Conversely, the gain in the darker parts of a low contrast scene can be reduced such that the contrast range of the displayed image is expanded to fit the television system capability.

It has been found that in practice, with a contrast correction arrangement according to this invention, the video signal output tends to lie around a 50% average picture level with optimum correction and so the manual potentiometer 10 can be replaced by a D.C. feedback signal of the proper sense, thereby automatically adjusting the magnitude of the expansion/compression characteristic. A feedback circuit for performing this function is shown in FIG. 3 in which the block 18 represents the arrangement shown within the dashed lines of FIG. 1. Output from terminal 17 is detected by a restorer 20 which provides an output signal that increases as the average video output level exceeds the black level. A smoothing circuit 21 comprising the series connection of a resistor 22 and a grounded capacitor 23 is connected to receive output from the restorer 20 and delivers a signal from the interconnection between the resistor 22 and capacitor 23 to one input of a comparator 24 which signal represents the average picture level. The other input terminal of the comparator 24 is connected to a D.C. reference source 25 which represents the desired level of the average picture level, typically 50%. The sense of the output of the comparator 24, which is applied at the controlling input of the multiplier 11 is arranged to be such that expansion or compression is automatically selected for the average picture level at the output terminal 17 to closest match the average picture level simulated by the D.C. reference source 25.

I claim:

1. A contrast correction arrangement for use in a colour television system including a plurality of camera tubes each for producing electrical signals corresponding to a different primary colour in a scene viewed by the tubes, a colour coder for producing from said plurality of camera tubes a composite colour coded signal in accordance with a predetermined broadcasting standard, means for producing from said plurality of camera tubes a signal representative of the greatest brightness in the viewed scene, means for producing a D.C. level control signal, a multiplier for multiplying the difference between the signal representative of the greatest brightness and a first predetermined peak amplitude thereof by said control signal such that a further signal is produced which is variable in both sign and magnitude in dependence upon the departure of said signal representative of the greatest brightness from peak amplitude, a further multiplier for multiplying said further signal with the difference between said composite colour coded signal and a second predetermined amplitude so as to produce a video correction signal of sign varying in dependence upon the sign of said further signal, and a mixer for adding the video correction signal to the composite colour coded signal thereby to produce at the mixer output a video signal of compressed, normal or expanded contrast range.

2. A contrast correction arrangement as claimed in claim 1 wherein gate means connected to the normally provided line and field blanking circuits is arranged to switch off the first mentioned multiplier at times during the line and field blanking periods.

3. A contrast correction arrangement as claimed in claim 1 wherein the means for producing a signal representative of the greatest brightness is a non-additive mixer known per se.

4. A contrast correction arrangement as claimed in claim 1 wherein said means for producing said control signal comprises a restorer for determining the mean level of the mixer output signal above black level and a comparator for comparing the output of said restorer with a D.C. reference signal whereby the resultant of said comparison is, in operation, applied as said control signal to said multiplier.

5. A contrast correction arrangement as claimed in claim 2 wherein the means for producing a signal representative of the greatest brightness is a non-additive mixer known per se.

6. A contrast correction arrangement as claim in claim 2 wherein said means for producing said control signal comprises a restorer for determining the mean level of the mixer output signal above black level and a comparator for comparing the output of said restorer with a D.C. reference signal whereby the resultant of said comparison is, in operation, applied as said control signal to said multiplier.

7. A contrast correction arrangement as claimed in claim 3 wherein said means for producing said control signal comprises a restorer for determining the mean level of the mixer output signal above black level and a comparator for comparing the output of said restorer with a D.C. reference signal whereby the resultant of said comparison is, in operation applied as said control signal to said multiplier.

* * * * *